United States Patent [19]

Sejimo

[11] Patent Number: 4,770,823
[45] Date of Patent: Sep. 13, 1988

[54] CHOKE VALVE MECHANISM FOR CARBURETOR

[75] Inventor: Yoshimi Sejimo, Urayasu, Japan

[73] Assignee: Walbro Far East, Inc., Kawasaki, Japan

[21] Appl. No.: 84,756

[22] Filed: Aug. 13, 1987

[30] Foreign Application Priority Data

Sep. 30, 1986 [JP] Japan ................... 61-232961

[51] Int. Cl.⁴ ............................................. F02M 1/10
[52] U.S. Cl. ................................. 261/39.1; 261/39.3; 236/101 E
[58] Field of Search ............... 261/39.3, 39.1; 236/101 C, 101 B, 101 R, 101 E

[56] References Cited

U.S. PATENT DOCUMENTS

| 1,968,553 | 7/1934 | Heitger | 261/39.3 |
| 2,062,260 | 11/1936 | Weber | 261/39.3 |
| 2,110,211 | 3/1938 | Farrell | 261/39.3 |
| 2,759,716 | 8/1956 | Jones | 261/DIG. 68 |
| 3,403,238 | 9/1968 | Buehler et al. | 236/101 E |
| 4,283,006 | 8/1981 | Fedewitz | 236/101 B |
| 4,294,780 | 10/1981 | Du Bois et al. | 261/39.3 |
| 4,608,208 | 8/1986 | Yogo et al. | 261/39.1 |

Primary Examiner—Tim Miles
Attorney, Agent, or Firm—Barnes, Kisselle, Raisch, Choate, Whittemore & Hulbert

[57] ABSTRACT

A diaphragm carburetor for internal combustion engines with a special choke valve to regulate the fuel and air mixture especially during hot restart of the engine. The disk choke valve has openings and a temperature responsive alloy member is positioned to overlie these openings to close them when the engine is cold and to open them when the engine is hot.

1 Claim, 1 Drawing Sheet

CHOKE VALVE MECHANISM FOR CARBURETOR

FIELD OF INVENTION

The present invention relates to a choke valve mechanism for a carburetor.

BACKGROUND AND OBJECTS OF THE INVENTION

A diaphragm carburetor has been employed for a small general-purpose internal combustion engine which should be operated in a variety of attitudes.

As is well known, at the initial start of the engine, a richer mixture than that used in a normal operation is supplied thereto for facilitating the starting. Because of this, in general purpose engines, a choke valve is first fully closed and then starting operation is carried out. However, concentration of a mixture required at the time of starting considerably varies depending on the temperature of the engine. Therefore, even if the concentration of the mixture is optimum at the low temperature, the mixture is sometimes excessively rich at the normal temperature.

Furthermore, in restarting the engine after the engine has already been operated, a mixture of normal concentration will suffice to be supplied since the temperature of the engine is higher than that of the initial starting. However, in restarting the engine when a quantity of fuel in a fuel tank is insufficient, fuel in the carburetor is insufficient or absent. Therefore, the choke valve is fully closed after the fuel has been supplied to the fuel tank, and then starting operation is carried out. In this case, however, the carburetor is filled with fuel and at the same time, a super-rich mixture is supplied to the engine. When the super-rich mixture is supplied to the engine, roping (starting operation, that is, pulling the recoil rope) has to be effected over and over again, especially when a throttle valve is in an idling position. It is usually necessary to move the choke valve to a fully open position to completely discharge the super-rich mixture. Furthermore, an ignition plug may be covered with the mixture depending on the displacement of the engine and the arrangement of the ignition plug, thus rendering starting impossible.

It is therefore an object of the present invention to provide a choke mechanism for a carburetor having an excellent startability which overcomes various starting conditions of the engine as described above.

For achieving the aforesaid object, the present invention provides an arrangement wherein a choke valve is formed with a leak hole, and a valve plate formed of temperature responsive alloy is superposed on the choke valve, said valve plate closing the leak hole at the time of low temperature while opening the leak hole at the time of high temperature.

BRIEF DESCRIPTION OF THE DRAWINGS

Drawings accompany the disclosure and the various views thereof may be briefly described as.

DETAILED DESCRIPTION OF THE INVENTION AND THE OPERATION

Figure 1:
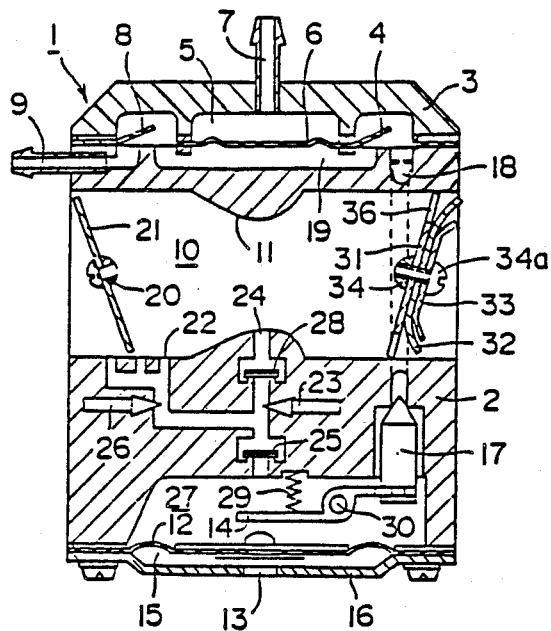
FIG. 1, a side sectional view of choke valve mechanism for a carburetor according to the present invention.

In the case where the ambient temperature or the temperature of the engine is low, a valve plate 32 formed of temperature responsive alloy is flat, and a leak hole 36 of a choke valve 31 is closed. Accordingly, the choking effect of an intake passage 10 is great, negative pressure generated in a throttle valve 21 is high, a large quantity of fuel is sucked through a low speed fuel jet 20, and a rich mixture is supplied to the engine whereby the engine may be started.

Conversely in the case where the temperature of the engine is high, the valve plate 32 is curved circularly away from the choke valve to open the leak hole 36 of the choke valve 31. Therefore, the negative pressure generated by the throttle valve 21 drops off, and a lean mixture suitable for the temperature of the engine may be obtained whereby the engine may be started easily.

In restarting the engine after the engine has been operated, even if the choke valve 31 is fully closed, a suitable mixture is supplied to the engine, since the leak hole 36 is opened by the valve plate 32, and there occurs no possible difficulty of starting.

In this way, even if the choke valve is closed, the leak hole of the choke valve is opened and closed according to the temperature of the engine. Therefore, a rich mixture and relatively lean mixture may be supplied to the engine at the time of low temperature and at the time of high temperature, respectively, to achieve the stabilized starting of the engine.

As shown in FIG. 1, a cover 3 is connected, with a diaphragm 6 interposed, to the upper wall of a carburetor body 2 provided with venturi 11 in an intake passage 10, and a cover 16 is connected, with diaphragm 12 interposed, to the lower wall thereof.

A pulsating pressure inlet 7 provided in the cover 3 is connected to a crank chamber of a two-cycle engine (not shown), and the pulsating pressure acts on the diaphragm 6 of a pulsating pressure inlet chamber 5 constituting a fuel pump. A fuel chamber 19 defined by the diaphragm 6 is connected to an inlet 9 through a check valve 8, and is connected to a metering chamber 27 through a check valve 4, a passage 18 and an inlet valve 17.

An atmospheric chamber 15 between a diaphragm 12 defining the metering chamber 27 and the cover 16 is opened into atmosphere through an atmospheric port 13. An inlet valve 17 in the form of a needle valve is disposed at the end of a passage 18 and is opened and closed by means of a lever 14. That is, one end of the lever 14, pivotally supported on the wall of the metering chamber 27 by ends of a shaft 30, is biased into engagement with the end of the inlet valve 17 by the pressure of a spring 29. The other end of the lever 14 abuts on a projection connected generally in the center of the diaphragm 12. The metering chamber 27 is connected to a high speed fuel jet 24 of the intake passage 10 through a high speed metering valve 23 and is connected to a low speed fuel jet 22 through a low speed fuel metering valve 26. Check valves 25 and 28 are provided in the fuel passage leading from the fuel chamber 27 to the respective fuel jets 22 and 24.

Figure 3:
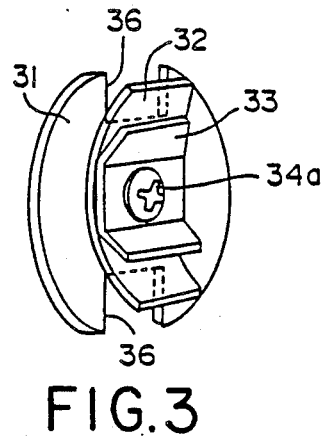
FIG. 3, a perspective view of the choke valve.
Figure 2:
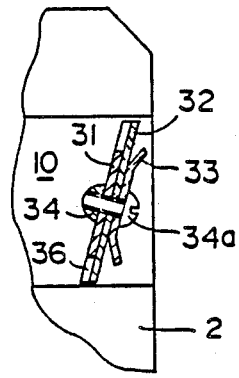
FIG. 2, a side sectional view showing another operation of the choke valve.

According to the present invention, a choke valve 31 is disposed on a valve shaft 34 at an upstream position away from the venturi 11 of the intake passage 10. This choke valve 31 is in the form of a flat disk as shown in FIGS. 2 and 3, at the edge of which are provided leak holes 36 (formed by a notch in the illustrated embodiment), and a valve plate 32 formed of a temperature responsive alloy is superposed thereon so that the leak holes 36 may be closed. A back-up plate 33 made of normal metal to prevent excessive deformation of the valve plate 32 is further superposed on the valve plate and secured to valve shaft 34 by means of a bolt 34a.

The valve plate 32 formed of a temperature responsive alloy is flat at a low temperature and closely superposed on the choke valve 31 to close the leak holes 36 whereas at a high temperature the valve plate 32 is curved as shown in FIG. 3 and moved away from the choke valve 31 to open the leak holes 36.

Next, the operation of the choke valve mechanism for the carburetor according to the present invention will be described.

In a manner similar to a conventional diaphragm carburetor 1 of this kind, fuel in a fuel tank (not shown) is supplied, by the diaphragm operated by the pulsating pressure of the crank chamber of the engine, to the metering chamber 27 through the inlet 9, check valve 8, fuel chamber 19, check valve 4, passage 18 and inlet valve 17. However, fuel pressure of the metering chamber 27 is maintained at a predetermined level by a spring 29 acting on the lever 14 pivotally moved about a pivot 30 and a diaphragm 12 subjected to atmospheric pressure. Fuel is injected toward the intake passage via the low speed fuel jet 22 or high speed fuel jet 24, depending on the open position of the throttle valve 21, and supplied to the engine.

In restarting of the engine after the engine has been operated, the opening degree of the throttle valve 21 is narrowed, and the choke valve 31 is fully closed as necessary. However, at the high temperature the valve plate 32 is curved outwardly and the leak holes 36 are opened. Therefore, negative pressure at the throttle valve 21 is not excessively increased, and the quantity of fuel sucked through the low speed fuel jet 22 is relatively small. A relatively lean mixture is supplied to the engine and the smooth restarting of the engine may be attained.

In the case where the engine is stopped due to the lack of fuel, no fuel will be present in the metering chamber 27. In this case, when the engine is restarted immediately after the fuel has been supplied to the fuel tank, the choke valve 31 is generally fully closed. If fuel is filled in the metering chamber 27 via the inlet valve 17 from the fuel tank by means of a fuel pump represented by the diaphragm 6 by initial roping, the choke valve 31 should be fully opened in view of the high temperature of the engine. However, an operator cannot directly view the metering chamber 27 to determine whether it is filled with fuel.

Under these circumstances, even if roping is repeatedly effected with the choke valve 31 fully closed, the leak holes 36 of the choke valve 31 are open when the engine is in the state of high temperature. Therefore, negative pressure generated at the throttle valve 21 passing through venturi 11 is not so high, and a suitable quantity of fuel having a moderate concentration is sucked through the low speed fuel jet 22; and a generally appropriate mixture is supplied to the engine whereby the engine is restarted by roping twice or more.

When the choke valve 31 is fully closed when the engine is started for the first time at the time of low temperature, the valve plate 32 formed of a temperature responsive alloy assumes a flat shape as shown in FIG. 2 and is superposed on the choke valve 31 so that the leak holes 36 are closed, whereby a great choking effect may be obtained. Suction gas passing through the throttle valve 21 is high in negative pressure, a large quantity of fuel is sucked through the low speed fuel jet 22 and a rich mixture suitable for the temperature of the engine is supplied to the engine and therefore the engine is started easily.

While in the above-described embodiment, the choke valve is integrally disposed in the intake passage of the carburetor, it is to be noted that this choke valve may be provided externally of the carburetor, that is, interiorly of an intake pipe connecting the carburetor and an air cleaner to obtain the effect similar to the above.

Moreover, it may be contemplated that a bimetal is used for the valve plate 32 of the choke valve but in this case a displacement relative to a variation of temperature is small and therefore no practical effect is obtained. The temperature responsive shape-memory alloy has a sharp characteristic relative to a variation of temperature and has a great deformation characteristic and deformation force, thus obtaining the positive effect above described.

The present invention provides a choke valve disposed at an upstream position away from venturi in an intake passage, in which leak holes are provided in the choke valve, on which is superposed a valve plate formed of a temperature responsive shape-storage alloy adapted to open and close the leak holes according to the variation in temperature, and therefore, the leak holes of the choke valve are closed at the time of low temperature to obtain a great choking effect, and a rich mixture is supplied to the engine, whereas at the time of high temperature, the valve plate is curved to open the leak holes of the choke valve to lessen the effect of the choke, and a leaner mixture is supplied to the engine. Accordingly, since the concentration of the mixture is automatically adjusted according to the temperature of the engine, the startability of the engine is greatly enhanced.

When the engine is restarted by supplying fuel in the event the engine has stopped due to the shortage of fuel, in general, the choke valve is fully closed to first fill the metering chamber of the carburetor with fuel, after which the choke valve is opened to supply a relatively lean mixture suitable for the temperature of the engine. However, it is not actually possible to make sure if the metering chamber is filled with fuel, and therefore a rich mixture is supplied to the engine. In the extreme case, the ignition plug is covered with the mixture, as a result of of which the engine sometimes cannot be started at all.

However, in the present invention, even if the choke valve is fully closed, fuel is filled in the metering chamber by initial roping, and if ropting is continuously effected, a super-rich mixture is not supplied to the engine since the leak holes of the choke valve are open to the degree that the engine is at the high temperature. In view of this, restarting of the engine may be accomplished readily.

At any rate, the engine may be started readily in one and the same operating procedure irrespective of the difference in starting conditions of the engine.

According to the present invention, there is no significant change in shape and dimension of the choke valve, and the valve plate formed of temperature responsive shape-storage alloy is superposed thereon, and a back-up plate is merely connected if necessary. Therefore, the mechanism may be easily fabricated without changing the specification of the conventional carburetor, and the present invention can be embodied immediately.

What is claimed is:

1. A choke valve mechanism for a carburetor having an air and fuel mixing passage supplied with fuel through main and idle jets from a diaphragm-controlled fuel chamber, and a throttle and choke valve in the mixing passage, that improvement in which a choke valve which comprises three contiguous plates mounted for pivot movement in said mixing passage on a choke control shaft including:

(a) a first plate substantially coextensive with said passage having diametrically opposed peripheral openings, (b) a second plate formed of shape-memory alloy secured centrally to said first plate having outer portions dimensioned to overlie said peripheral openings of said first plate, said outer portions being movable in response to temperature to close said openings at low temperatures and open said openings at high temperatures, and (c) a third plate secured centrally to said second plate having end portions angled from the general plane of said plates away from said openings to limit the axially outwardly movement of said outer portions of said second plate under conditions of high temperature.

* * * * *